United States Patent [19]

Burton et al.

[11] 4,406,947
[45] Sep. 27, 1983

[54] CALIBRATING DEVICE FOR IONIZING RADIATION DOSIMETERS

[75] Inventors: Charles A. Burton; Gordon K. Riel, both of Silver Spring, Md.

[73] Assignee: The United States of America as represented by the Secretary of the Navy, Washington, D.C.

[21] Appl. No.: 255,122

[22] Filed: Apr. 17, 1981

[51] Int. Cl.³ .................. G01D 18/00; G12B 13/00
[52] U.S. Cl. ............................ 250/252.1; 250/497.1
[58] Field of Search .............. 250/496.1, 497.1, 252

[56] References Cited

U.S. PATENT DOCUMENTS 3,353,023 11/1967 Lowery et al. ............... 250/497.1
3,372,281 3/1968 Auld et al. ................... 250/497.1
3,544,793 12/1970 Bless et al. .................. 250/497.1
4,152,600 5/1979 Berry ............................... 250/252

*Primary Examiner*—Bruce C. Anderson
*Attorney, Agent, or Firm*—R. S. Sciascia; A. L. Branning; J. C. LaPrade

[57] ABSTRACT

A transportable calibration and storage device for use in calibrating radiation dosimeters. The calibration device comprises a drum filled with a radiation attenuating material that may be solid, water, or water-extended solid. This material shields the radiation source that is retained in a safe position in the drum at all times. During the calibration cycle the radiation source may be moved to a low or high calibration position within the drum so as to allow calibration of the dosimeter with a known radiation intensity.

12 Claims, 11 Drawing Figures

SOURCE IN STORAGE POSITION

SOURCE IN LOWER CALIBRATION POSITION

SOURCE IN HIGHER CALIBRATION POSITION

CALIBRATING DEVICE FOR IONIZING RADIATION DOSIMETERS

BACKGROUND OF THE INVENTION AND OBJECTS OF THE INVENTION

To completely comprehend the background of the invention the following definitions should be considered.

A dosimeter is a device for measuring ionizing radiation. It may be active, as in a remmeter or other Radiac or it may be passive such as film, TLD or personnel dosimeter.

Ionizing radiation is radiation that effects personnel by ionization. This includes radiation which has no charge but produces ions in the body, for example ions produced by neutrons and gamma rays.

In the past the Navy has used several calibrators and radiation source storage containers. Until the development and wide use of the instant invention which shall be called calibrator AN/UDM-10 the prior art device in use was about three feet by three feet by four feet in size and was filled with approximately 2000 pounds of wax.

It was very difficult to load and unload from Navy ships, sometimes a special port had to be constructed in the side of a ship to accommodate the device.

In addition, this device used a 5 Curie Plutonium Beryllium radiation source, in order to emit sufficient intensity to serve as a calibration source.

In addition, for shipment, the radioactive source had to be transferred to another container. This required two containers and exposed personnel to direct radiation from the unshielded source during transfer.

The invention claimed in this application clearly presents many advantages and advancements over the prior art calibration device.

Therefore, it is one object of this invention to provide a transportable radiation source container that may be used as both a calibration device and a shipping container.

It is another object of this invention to provide a radiation calibration device that can be manually loaded on Navy ships without the use of a crane.

It is a still further object of this invention to provide a portable calibration device that contains a non hazardous filler made of a neutron attenuation material that may be extended by water.

It is another object of this invention to provide a calibration device that has means for storage of radiation source material at the center of the small portable radiation calibration device and has a built in means for moving the source to various calibration positions within the device.

It is a still further object of the invention to provide a calibration device that will allow mounting of the dosimeter directly on the top of the calibration device.

It is a still further object of this invention to provide a calibration device that has a relatively high intensity compared with prior art calibrators with similar small radiation sources and similar low personnel radiation exposure requirements.

SUMMARY OF THE INVENTION

All dosimeters require calibration. Well known, but non transportable radiation fields are provided at the National Bureau of Standards. Certain dosimeters are evaluated in those fields and then are used to determine the relative response to field calibrators, such as the instant invention. Thus the magnitude of the field calibrator's intensity may be arbitrary, but it must repeat precisely within 1 or 2%.

This improved calibration device is transportable and can provide field calibration of dosimeters, including remmeters used a board Navy ships throughout the fleet. It is provided with a unique means for moving the radiation source from the center of the portable storage device to the low and high calibration positions.

More specifically a small steel drum that is approximately 30 inches high is filled with a water extended polyester or other well known shielding material that acts as a shield to neutron flux. The radioactive source, (100 milli Curies of Americium beryllium,) is placed in a source capsule located at or near the mid point of the storage calibration drum. The source capsule is attached by screw threads or other convenient mechanical means to a handle so that when the handle is raised the source can be positioned in either calibration position and the handle is removed to permit neutron flow through an exit opening.

When the source capsule is in either the high or low calibration positions the scattering effects from nearby objects and errors due to a asymmetry of the remmeter or other dosimeter are avoided. An accurate field calibration of the dosimeter can thus be performed in a very efficient manner. Furthermore the source can be of lower intensity than the calibration sources in the prior art. Therefore health hazards to operators and personnel in the immediate area are substantially reduced. In this invention, the source may be located at a position that is adjacent to the dosimeter to be calibrated. The present invention together with further characteristics thereof, may be understood by reference to the following description taken in connection with the drawings accompanying the description.

DESCRIPTION OF THE PREFERRED EMBODIMENT

Figure 1:
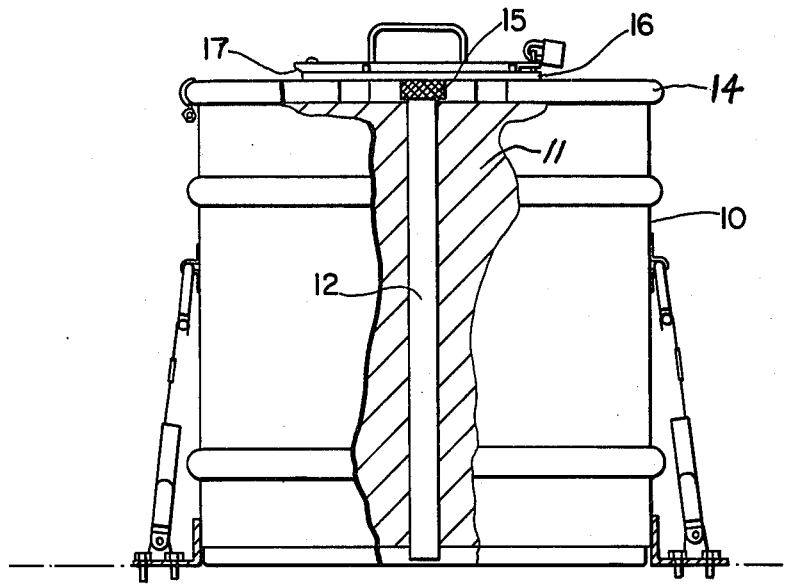
FIG. 1 is a partial cutway side view of the cylindrical drum calibrator of this invention.
Figure 4:
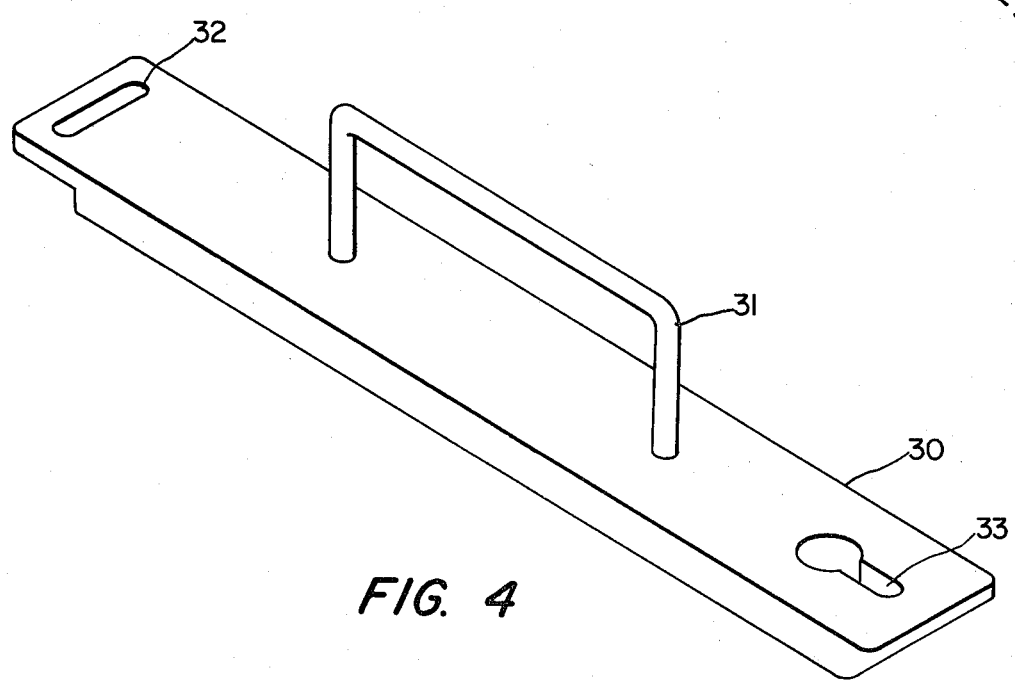
FIG. 4 is a perspective view of the locking bar of the invention.

FIG. 1 discloses the cylindrical drum calibration storage device of this invention. The drum 10 is filled with a polymer, preferably a solid polymeric thermosetting resin, capable of shielding neutron flux or slowing the neutron flow to the point that the dose rate to any operator of the calibration device is well below established safe limits for such work. The drum 10 is filled with a polymeric material that may be formed in situ, that is in one preferred embodiment, a water extendable polyester 11. A cylindrical hole 12 is provided through the shield, at the axis of the cylinder, in FIG. 1. The moving parts of the calibrator FIG. 9 including the radiation source are all in this hole 12. The calibration storage device 10 is fitted with a metal cover 13 FIG. 2 that is clamped by clamp member 14 and welded or otherwise permanently secured in a closed position. The cover for the calibrator is fitted with an opening 15 usually from 1 to 2 inches in diameter through the cover 13. The opening 15 is surrounded by a metallic mounting plate 16 that is welded in position. Security is provided by locking the source holder and the entire handle assembly in storage position by locking bar 17. The flat locking bar 17 may be fitted with a handle 31 as best shown in FIG. 4.

Figure 3:
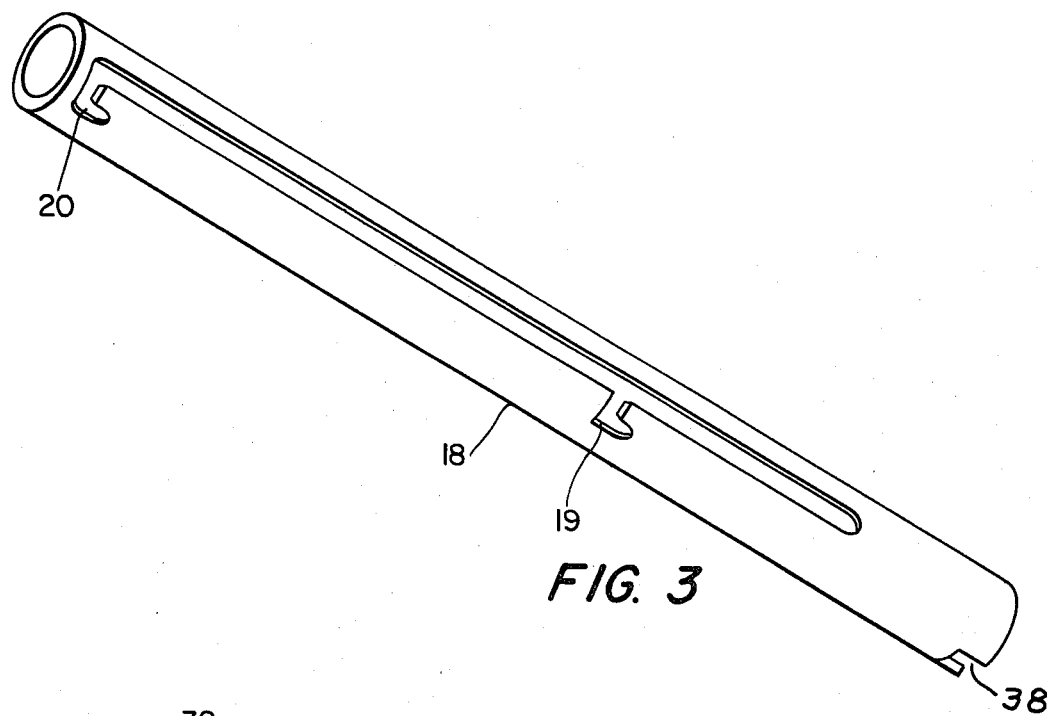
FIG. 3 is a view of the guide that depicts the "J" slots for the low and high calibrate positions.

FIG. 3 illustrates a guide member 18 usually made of stainless steel. This guide member is fitted with a pair of J slots 19 and 20. It is placed in the hole 12 in the shield, and serves to hold the radioactive source is selectable, fixed positions.

Figure 5:
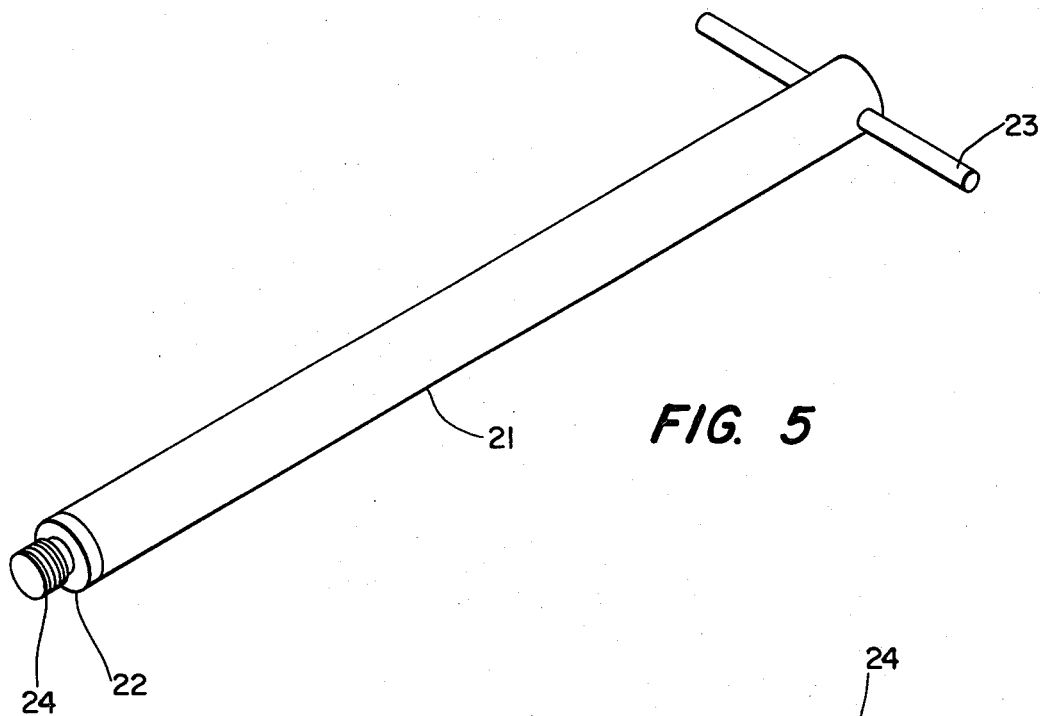
FIG. 5 is a perspective view of the upper shield rod for the source container.
Figure 6:
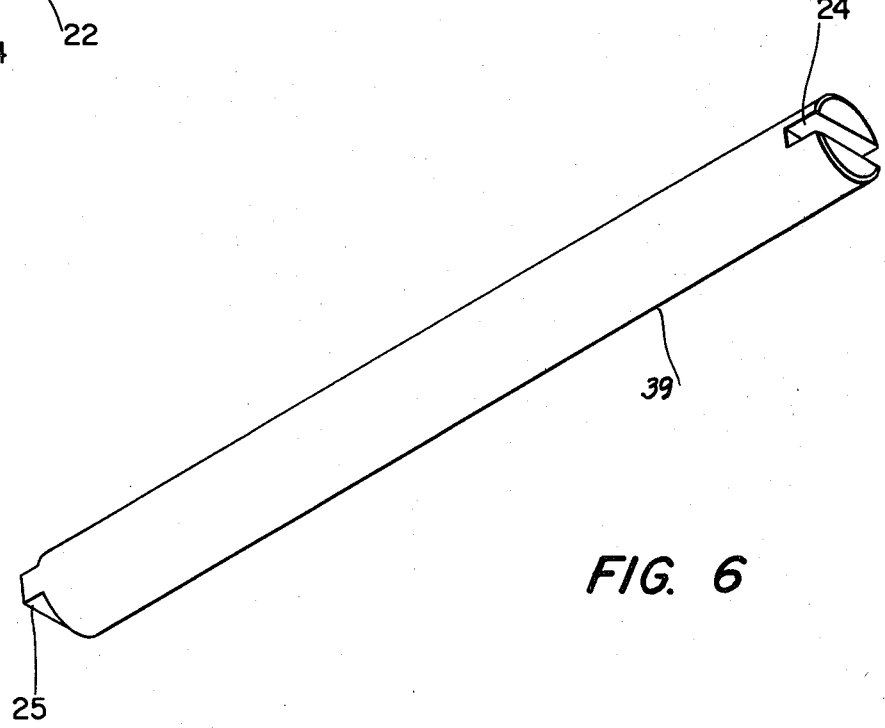
FIG. 6 is a isometric view of lower shield rod.

The plastic rod 21 FIG. 5 may fit within the confines of the guide member 18 and the tang 25 of the plastic rod 39 (FIG. 6) may fit within the slot 38 of the guide 18 (FIG. 3).

In FIG. 5, on the lower end of the rod 21 a stainless steel fitting 22 with screw threads machined or otherwise integrally affixed to the lower end thereof. A source holder 26, best shown in FIG. 7 may be attached to the fitting 22. The handle grip 23 (FIG. 5) is designed to fit through the upper end of the handle 21, in such a position as to allow it to be turned by the hand of the operator of the calibration storage device.

Figure 7:
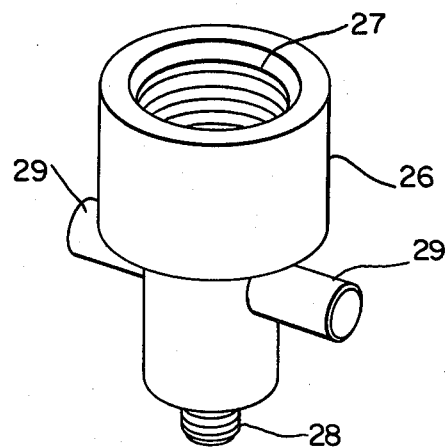
FIG. 7 is an isometric view of the source holder.

FIG. 7 shows an isometric view of the source holder 26 that may be used to connect to shield rod 21. The source holder 26 is fitted on its inside upper wall 26 with screw threads 27 designed to be connected with the stainless steel fitting 22. The lower end of source holder 26 has a projection 28 also fitted with male screw threads 28 that are readily adapted for attachment to typical radiation source capsules that are supplied with screw threads for mounting. It should be noted that a pair of rods 29 project from the source holder 26 in a horizontal plane. These rods are designed to fit within the J slots 19 and 20 best shown in FIG. 3. It is by means of combination of the rods 29 and the J slots 19 and 20 that the radiation source holder 26, is positioned precisely at the desired position 19 or at the high calibration position 20.

Figure 2:
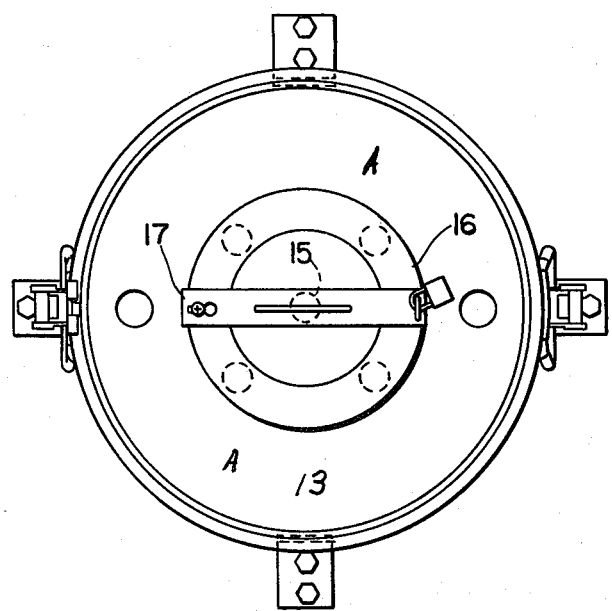
FIG. 2 is a top view of the drum calibrator of this invention.

FIG. 4 illustrates the locking bar handle assembly 30 that be utilized to securely lock and store the radiation source within the container. In FIG. 4 the flat plate locking bar is provided with opening 32 and 33. These openings fit over screw and a locking mount on the upperwall of member 34 best seen in FIG. 8. In FIG. 2 the locking bar 17 is shown located to mounting plate 18 with a padlock.

Figure 8:
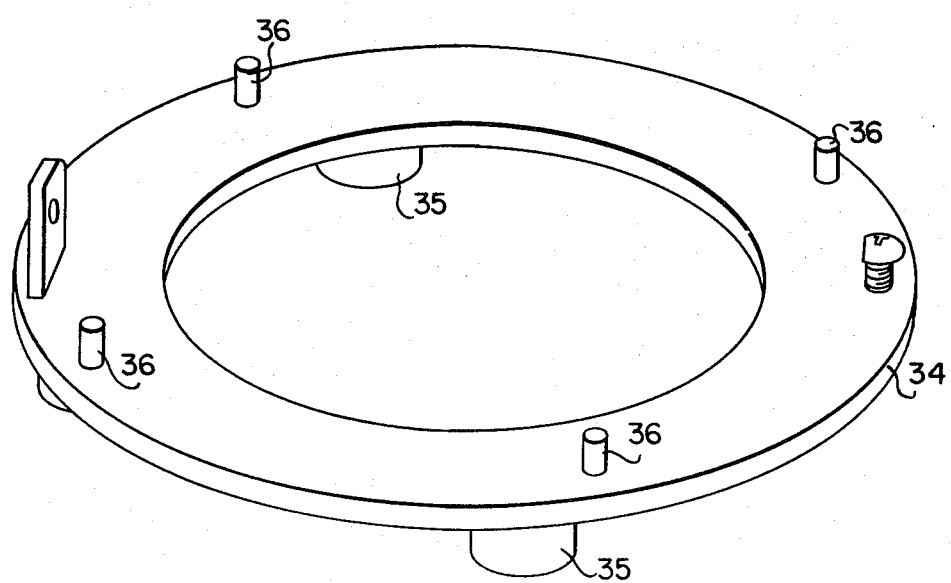
FIG. 8 is an isometric view of the mounting plate that holds the meter or dosimeter being calibrated in a precise position on the calibrator.

FIG. 8 illustrates an attaching plate 34 that is used to mount any remmeter or other device that is needed to be calibrated. In FIG. 8 the plate 34 is fitted with four mounting pins 35 on the base thereof. The mounting pins 35 are welded to the top face of member 13, best shown in FIG. 2. A plurality of centering pins 36 are affixed to the upper face of plate 34. These centering pins 36 fit around the base of the meter to be calibrated.

Other convenient arrangements for mounting a meter or other device to be calibrated on attaching plate 34 will be apparent to those skilled in the art.

Figure 9:
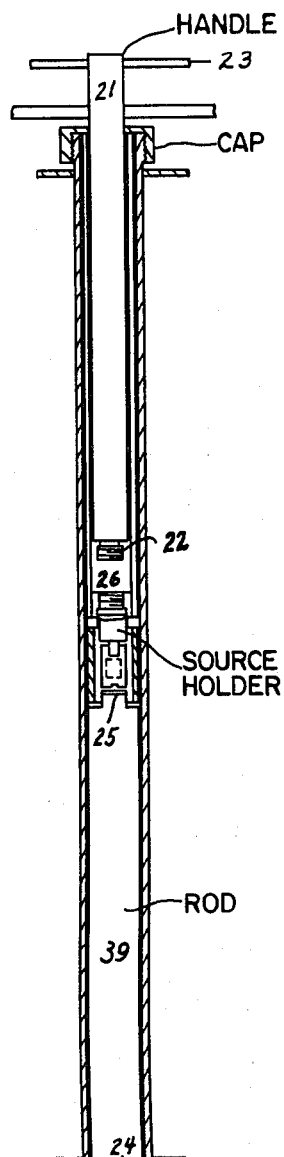
FIG. 9 is a cross sectional view of the source in storage position.

FIG. 9 is a cross sectional view taken along line A—A of FIG. 2. The rod 21 has a stainless steel threaded member 22 attached to source holder 26. The source capsule and source are fastened to the lower end of the source holder 26. The lower shield rod 39 holds guide member 18, and is itself held by rivet 24 so that the entire assembly is rigidly and permanently held in place. Once rivet 24 is set, the source cannot be removed by accident.

Figure 10:
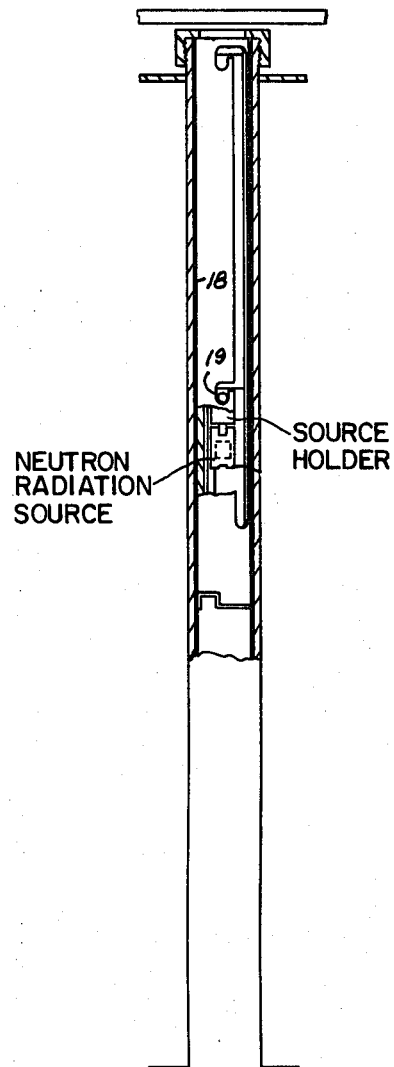
FIG. 10 is a cross sectional view of the source in a lower calibration position.

In FIG. 10 the horizontal rods 29 are engaged in J slot 19 thereby retaining the source holder 26 precisely in the lower calibration position.

Figure 11:
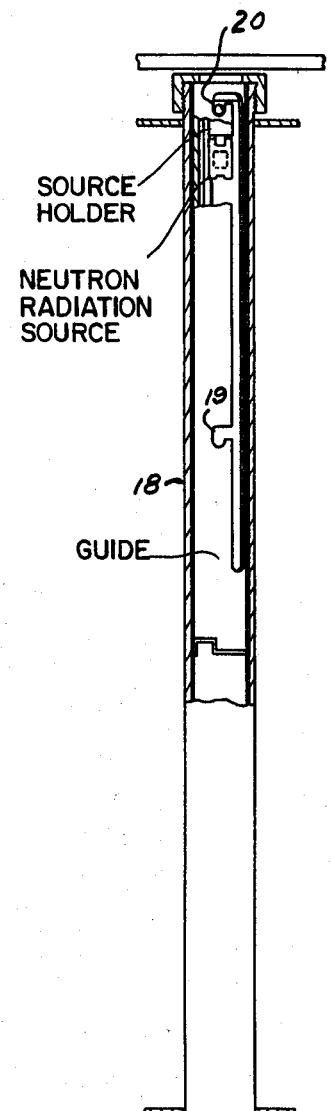
FIG. 11 is a cross sectional view of the source in the higher calibration position.

In FIG. 11 the source holder 26 and a square capsule are held precisely in the upper calibration position by the horizontal rods 29 engaging the upper "J" slot 20.

The following discussion of assembly of the calibrator from its parts is to aid in understanding the preferred embodiment and to point out how the radioactive source is secure against accidental removal. First, note that the hole (1–12) contains a metal tube that is welded to both ends of the drum (1–10) thus forming a tight enclosure in which the shield material (1–11) is poured. The ends of this tube extend beyond the ends of the drum, and are the means of securing the movable parts.

The top of the tube is fitted with a cap (1–15), which is welded as well as screwed to the tube. The hole in the cap is just sufficient to admit the upper rod (9–21) and will not pass the other movable parts. To assemble the calibrator, insert from the bottom of hole (1–12) the guide tube (3–18) with the source holder (7) mounted in it. Insert the upper rod through the cap, and engage the source holder, holding it firmly. Following approved procedures, obtain the radiation source, add a drop of locking compound to its threads, and place it in a plastic rod (not shown) which is made for this purpose. This rod has a hole to accommodate the source, and is sized to fit the hole, with sufficient extra length to serve as a handle. Such tools are common in the art of radioactive source manipulation, where the operator should not touch the source. The source is thus inserted in the bottom of the hole, until it contacts the source holder (7). Then it is screwed to the source holder, and the locking compound insures that it will not accidentally loosen. The special rod is then removed, the lower plastic rod (39) is inserted, so that the tang of the rod engages the slot 38 in the guide tube 18. The rivet 24 secures the lower rod against removal and turning. The lower rod 39 in turn secures the guide tube against rotation and removal, and since the source carrier cannot be removed from the guide tube, the source is now secure against accidental removal.

The following discussion of operation of the calibrator is to make the preferred embodiment more clear, and to illustrate how a single device provides secure storage, an approved shipping container, and various radiation intensities for calibration. Begin with the source in the lowest, that is the storage position shown in FIG. 9. With the locking bar 30 in place and secured by a padlock, as in FIG. 2, the container is ready for storage. Adding of a simple wooden cover and attaching the calibrator to a wooden pallet, as is common to those engaged in packing and shipping, prepared the container and source for shipment. To use the calibrator, unlock the padlock and remove the locking bar 17 in FIG. 2.

In these instructions the "handle" is on the upper plastic shield rod 21 in FIG. 9. To move the source to the upper calibration position:

1 Raise the handle to its upper limit. Turn the handle clockwise (about 45°) until a physical stop is felt.
2. Release the handle so that it drops (about ½-inch) into a locking slot in the guide.
3. Pressing down, rotate the handle *counterclockwise* approximately four complete turns. This will separate the handle from the source holder.
4. Withdraw the handle from the AN/UDM-10. Set the handle aside for reuse.

To move the source to the lower calibration position:

1. Replace the handle in the center hole of the AN/UDM-10.
2. Rotate the handle *clockwise* approximately four turns until finger-tight.
3. Lift the handle ½-inch to free it from the locking slot in the guide; rotate it ¼-turn *counterclockwise* until physical contact is felt. Lower the handle until it bottoms.
4. Raise the handle approximately 2½ inches applying a small amount of pressure in a *clockwise* direction until the handle roates (about 45°) and a physical stop is felt.
5. Release the handle so that the source holder drops (about ½-inch) into a locking slot in the guide.
6. Pressing down, rotate the handle *counterclockwise* approximately four complete turns. This will separate the handle from the source holder.
7. Withdraw the handle from the AN/UDM-10. Set the handle aside for reuse.

To move the source to the storage position:

1. Replace the handle in the center hole of the AN/UDM-10.
2. Rotate the handle *clockwise* approximately four turns until finger-tight.
3. Lift the handle ½-inch to free it from the locking slot in the guide; rotate it ¼-turn *counterclockwise* until physical contact is felt. Lower the handle until it bottoms.
4. Replace the locking bar. Secure with the padlock.

It is to be understood that the foregoing disclosure relates to only a preferred embodiment of the invention and that various modifications may be resorted to be those skilled in the art without departing from the spirit and scope of the invention. For example, by selection of a source of gamma ray shielding material, gamma ray isotopic source of radiation, and appropriate change of drum and dosimeter mounting dimensions, gamma radiation meters may be calibrated, and the selected gamma ray source may be shipped. Further with appropriate changes in meter mounting, a variety of personnel radiation dosimeters may be calibrated. Further by addition of more, or fewer, J slots 19 and 20, best shown in FIG. 3, a variety of calibration intensities may be provided. Therefore, the scope of the invention should be defined only by the appended claims.

What is claimed as new and desired to be secured by Letters Patent of the United States is:

1. A calibrating device for ionizing radiation dosimeters comprising a cylindrical drum, a solid polymeric lining filling the entire opening within the drum, wherein the polymeric filling is capable of shielding ionizing radiation, a cylindrical opening through the polymeric filling, said opening filled with a longitudinal sleeve means located within said filling including multiple slotted means positioned in a rigid sleeve member, wherein each slotted means corresponds to a separate calibration position, the said sleeve fitted with handle means to hold and vertically move a radiation source along the axis of the cylindrical opening for the purpose of moving the radiation source from a storage position to multiple calibration positions and with means to remove the handle from the source so that the cylindrical opening from the source to the top is open to receive a radiation dosimeter that is to be calibrated by exposure to the source.

2. The calibrating device of claim 1 wherein a metal sleeve means is inserted in the cylindrical opening.

3. The calibrating device of claim 1 wherein the polymeric filling is a water extended polyester that is a solid material.

4. The calibrating device of claim 1 wherein the sleeve is fitted with a cylindrical handle that is mechanically attached at its lower end to a radioactive source.

5. The calibrating device of claim 1 wherein the radiation source holding means is a combination of a cylindrical handle mechanically attached to a source holder, the handle, the said cylindrical handle being slidably encased in a vertically oriented cylindrical sleeve, with mechanical means located at multiple positions along the vertical axis of the sleeve to securely position the source holder at several successively different levels along the vertically oriented sleeve.

6. The calibrating device of claim 5 wherein the means to move the radiation source holder comprises a cylindrical handle made of a polymeric material.

7. The calibrating device of claim 6 wherein the cylindrical handle is supported by a cylindrical rod positioned at the base of the cylindrical opening.

8. The calibrating device of claim 6 wherein the cylindrical handle is attached at its lower end to a radiation source holder by mechanical means.

9. The calibrating device of claim 8 wherein the mechanical means for attachment of the source holder is a set of standard screw threads.

10. The calibrating device of claim 5 wherein the radiation source holder is fitted with means to physically attach the radiation source holder to the surrounding sleeve means.

11. The calibrating device of claim 6 wherein the radiation source holder is fitted with a horizontal attachment means that fits within the confines of a slot in the said sleeve means.

12. The calibrating device of claim 11 wherein a plurality of horizontally disposed slots are located at selected intervals along the vertical axis of the sleeve means, each of said slots being capable of accommodating the horizontal attachment means on the radiation holder.

* * * * *